April 29, 1952 P. J. BAUERLE 2,594,844
PRECISION MEASURING TOOL
Filed Feb. 3, 1950
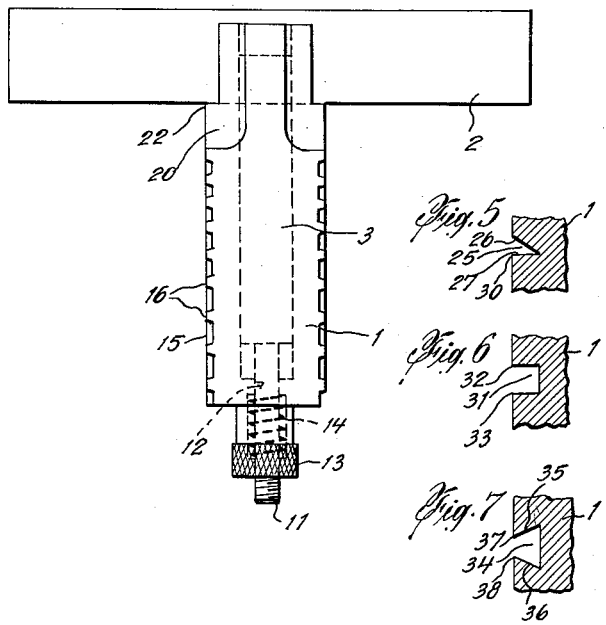
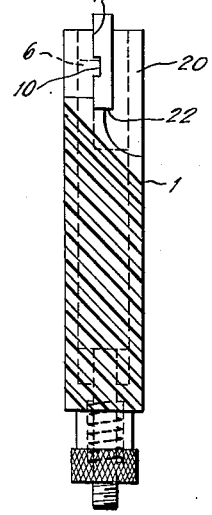
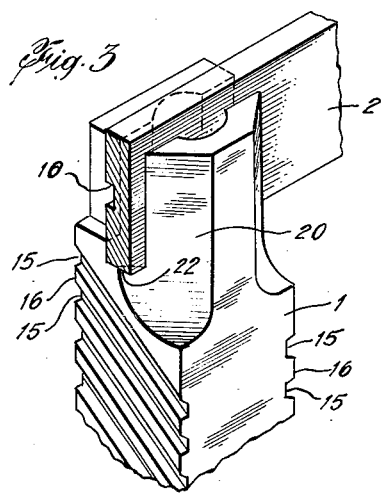
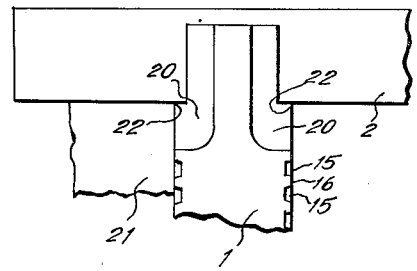
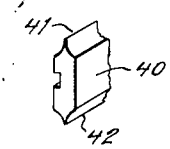
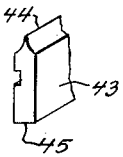
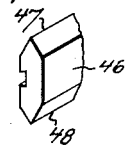
INVENTOR.
Paul John Bauerle
BY John P. Chandle
his ATTORNEY Patented Apr. 29, 1952

2,594,844

UNITED STATES PATENT OFFICE 2,594,844

PRECISION MEASURING TOOL

Paul John Bauerle, Flushing, N. Y.

Application February 3, 1950, Serial No. 142,303

5 Claims. (Cl. 33—112)

This invention relates generally to tools and more particularly to a precision-type tool for indicating the accuracy of a flat surface.

In machine shop operation the use of precision tools or instruments for checking or measuring work being machined or hand finished is a basic requirement. Especially so when precision metallic parts are to be made that must conform to specifications prescribing tolerances measurable in thousandths of an inch. It is obvious that the conventional T-squares cannot be utilized for such precision measurements and that special instruments would be required. These so-called special instruments have been found to permit inaccuracies of measurement through human error or by fine particles of dust invisibly clinging to the measuring surfaces thereof.

The human error is usually introduced by failure of the eyes to observe the closeness of the manufactured part to the measuring member. Considering the caliber of the tolerances, it is readily apparent that the tool must include features which assist the eyes of the user in determining the accurate function thereof. It is toward this end that the instant invention is directed and therefore a principal object thereof resides in the provision of means whereby the proximity of a manufactured part to a measuring T-square can be readily ascertained by the presence or absence of light therebetween.

Another object provides for means that will materially reduce the possible presence of dust on the measuring surfaces of the square.

A further object provides for an improved tool which may be employed either as an inside or outside square.

Another object provides for means which will eliminate undesirable reflected light.

Other ancillary objects will be apparent from the following detailed description, in which:

Fig. 1 is a front elevational view of the invention.

Fig. 2 is a side elevational view of a square illustrating in dotted lines the blade locking mechanism.

Fig. 3 is a fragmentary perspective view of the square.

Fig. 4 is a fragmentary front elevational view of the invention and the surfaces of a machined or handmade part being checked thereby.

Figs. 5, 6 and 7 are fragmentary sectional views of alternate embodiments of the dust catching grooves.

Figs. 8, 9, 10 and 11 are fragmentary perspective views of alternate forms of the blades.

Referring to Figs. 1 and 2, the invention consists essentially of a blade supporting or holding member 1 and a blade member 2 which is slidably and rigidly secured thereto by means of a locking device 3. The blade 2 is adapted to reside in a recessed groove 4 formed in the upper portion of the holder 1 and is held therein by the slidable lock 3. The lock 3 has an upwardly extending arm 5 with a protrusion 6 thereon. The said blade member 2 has recessed therein a transverse groove 10 which is engageable by the protrusion 6. The lower extremity of slidable lock member 3 has a threaded arm 11 dependent therefrom which passes through a related aperture 12 in blade supporting member 1. A knurled nut 13 adapted to retain a spring 14 therein, may be turned on the threaded arm 11 which will urge the locking member 3 downwardly effectively retaining the blade 2 in the said recessed groove 4. The loosening of the nut 13 permits the positioning of blade 2 in any desired position relative to the supporting member 1.

As shown in Fig. 3, the blade supporting member 1 has formed therein plural grooves 15 which are arranged diagonally on opposite sides of the member 1. The lands 16 located between the grooves 15 are of such proportion to provide a surface which is parallel and which forms a 90° angle relative to the underside of the blade 2. The grooves 15 effectively trap dust or dirt that may lodge on the machined part being measured and thus avoid inaccurate measurements.

A further novel feature of the precision tool is disclosed in the recesses 20. As illustrated in Fig. 4, the external manufactured part 21 is to be measured for accuracy of the 90° angle formed by the top and side thereof, and in doing so, a user would observe for the presence of light between the blade 2 and the top of part 21 and the member 1 and the side of part 21. It is evident that the assembly must be held parallel to the eye and the recess 20, being cut away, facilitates the observation. Without the recess 20, conventional squares, not shown, limit the perception of light in that the corner of the square is shadowed by the extraneous edge of the square. It is apparent therefore, that anyone utilizing the instant device may achieve a relatively greater degree of accuracy in measuring. As shown in Fig. 3, the recess 20 is cut back to a point 22 adjacent the underside of the blade 2, thereby permitting close inspection of the angle formed by the blade 2 and the related side of member 1, and subsequently the accuracy of relationship between the external part and the square.

Alternate forms of the lands and grooves are illustrated in Figs. 5, 6 and 7. The groove 25, Fig. 5, is formed by sides 26, 27 and provides a dust catching ledge at 30.

Fig. 6 illustrates a square-cut groove 31 having dust catching ledges 32, 33 thereon.

Fig. 7 illustrates a groove 34 formed by inwardly slanting side walls 35, 36, the design of which increases the dust catching potentialities of the ledges 37, 38 formed thereby.

Various types of slidable blade members could be utilized with the instant invention, as shown in Figs. 8, 9, 10 and 11, wherein a blade 40 having two oppositely positioned knife edges 41, 42 thereon, is disclosed. Fig. 9 likewise discloses a blade 43 having a knife edge 44 and a flat edge 45 thereon. In Fig. 10 the blade 46 has two oppositely positioned knife edges 47, 48 thereon, differing from the aforementioned blade 40 in that the sides of the knife edges 47, 48 are flat while the sides of the knife edges on blade 40 are curved.

Blade 50, Fig. 11, is analogous to blade 43 in that a flat edge 52 and a knife edge 51 is provided except the sides of edge 51 are flat while the sides of edge 44 are curved. The curved and flat edges provide maximum ease of observation when employed in the manner best suited therefor.

It is proposed that inaccuracies due to the glare of reflected light be reduced to a minimum, by the coloring of all measuring surfaces of the blades. In this manner stray reflected light can be readily differentiated from the observable light between the blade and the measured part. While many coloring processes are available, it is preferred that the blades be colored by the well known "blueing" process.

It is understood that while the invention, as illustrated is applied to a holder having a slidable blade therein, it could readily be applied to a holder having a fixed blade thereon.

While four specific forms or embodiments of the invention have been shown and described herein for illustrative purposes, and the construction and arrangement incidental to a specific application thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A precision-type instrument of the class described including a blade, a blade holder and means for locking said blade in said holder, said blade holder having a plurality of grooves in plural sides of said holder, plural lands formed thereby being of equal height to provide a flat plane, said holder further having plural recesses therein extending rearwardly to terminate adjacent the underside of said blade.

2. A precision-type instrument of the class described for indicating the relative flat surface of an external part including a blade, a blade holder and means for locking said blade in said holder, said blade holder having a plurality of dust catching grooves in at least one of the sides thereof, plural lands formed thereby adapted to present a flat surface to one side of said external part, and said grooves formed diagonally and parallel one to the other relative to said blade.

3. A precision-type instrument of the class described for indicating the relative flat surface of a machined part including a blade, a blade holder and means for locking said blade in said holder, said blade holder having a plurality of dust-catching grooves in at least one of the sides thereof, plural lands formed thereby adapted to present a flat surface to one side of said machined part, and said grooves formed diagonally and parallel one to the other relative to said blade, said holder having a recess therein extending rearwardly to terminate adjacent the underside of said blade.

4. A precision-type instrument of the class described for indicating the relative flat surface of a machined part including a blade, a blade holder and means for locking said blade in said holder, and said holder having plural recesses formed in said holder extending rearwardly to terminate adjacent the underside of said blade adapted to permit a visual observation of said machined part relative to said blade and holder.

5. An improved precision-type instrument adapted to be employed as an inside and outside square, including a blade, a blade holder and means for locking said blade in said holder, means formed in said holder adapted to catch dust particles, and said latter means comprising pluralities of lands and grooves with the upper surfaces of the former terminating in the same plane.

PAUL JOHN BAUERLE.

REFERENCES CITED

The following references are of record in the file of this patent:

UNITED STATES PATENTS

| Number | Name | Date |
|---|---|---|
| 761,707 | Peyman | June 7, 1904 |
| 794,031 | Lehman | July 4, 1905 |
| 1,446,679 | Williome | Feb. 27, 1923 |
| 1,488,401 | McCracken | Mar. 25, 1924 |
| 1,946,432 | Aldeborgh | Feb. 6, 1934 |
| 2,315,004 | Painter | Mar. 30, 1943 |
| 2,491,672 | Lowenstein | Dec. 20, 1949 |

FOREIGN PATENTS

| Number | Country | Date |
|---|---|---|
| 98,870 | Sweden | Mar. 14, 1940 |